United States Patent

Gosdowski et al.

[11] Patent Number: 5,593,018
[45] Date of Patent: Jan. 14, 1997

[54] APPARATUS FOR SHIFTING WORK CARRIERS

[75] Inventors: Gerhard Gosdowski, Bietigheim-Bissiungen; Werner Arleth, Esslingen; Peter Ulmer, Urbach, all of Germany

[73] Assignee: Robert Bosch GmbH, Stuttgart, Germany

[21] Appl. No.: 468,828

[22] Filed: Jun. 6, 1995

[30] Foreign Application Priority Data

Aug. 25, 1994 [DE] Germany .......................... 44 30 159.6

[51] Int. Cl.⁶ .................................................. B65G 37/00
[52] U.S. Cl. .................................. 198/370.1; 198/370.01
[58] Field of Search ........................... 198/370.01, 370.1, 198/370.08, 597

[56] References Cited

U.S. PATENT DOCUMENTS

| Re. 25,673 | 11/1964 | Burt ........................................ 198/370.1 |
| 3,690,435 | 9/1972 | King et al. . |
| 4,658,947 | 4/1987 | Welder ............................ 198/370.01 X |
| 4,926,999 | 5/1990 | Fauth, Sr. et al. ................. 198/370.1 X |
| 5,165,516 | 11/1992 | Reed et al. ............................ 198/370.1 |
| 5,205,394 | 4/1993 | Zeuschner ............................. 198/370.1 |

FOREIGN PATENT DOCUMENTS

| 0434862 | 7/1991 | European Pat. Off. ............ 198/370.1 |
| 1156224 | 6/1989 | Japan .................................. 198/370.1 |
| 3195626 | 8/1991 | Japan .................................. 198/370.1 |
| 5132130 | 5/1993 | Japan .................................. 198/370.1 |
| 1442481 | 12/1988 | U.S.S.R. ............................. 198/370.1 |

*Primary Examiner*—James R. Bidwell
*Attorney, Agent, or Firm*—Spencer & Frank

[57] ABSTRACT

An apparatus for shifting work carriers from a main conveying path (40) to a branching conveying path (45) arranged transversely thereto wherein the. The main conveying path (40) consists of a feeding conveying path (41) and a discharging conveying path (42). The conveying paths (40, 41, 42, 45) are formed from double-belt conveyors, one transport belt (45') of the branching conveying path (45) being arranged between the feeding conveying path (41) and the discharging conveying path (42). The feeding conveying path (41) and the discharging conveying path (42) are arranged with their ends in each case above the plane of the transport belt (45') of the branching conveying path (45). In the discharging conveying path (42), the transport belts (42', 42") are provided with lifting devices (20) which lower and lift the two tight sides (17) of the transport belts (42', 42") from a first plane at the height of the plane of the feeding conveying path (41) into a second plane below the plane of the branching conveying path (45) and vice versa.

7 Claims, 3 Drawing Sheets

APPARATUS FOR SHIFTING WORK CARRIERS

PRIOR ART

The invention relates to an apparatus for shifting work carriers from a feeding conveying path to a further conveying path, and having a lifting device which is arranged in a transfer zone for the work carrier and with which the work carrier can be transferred from the feeding conveying path onto the further conveying path. U.S. Pat. No. 3,690,435 discloses an apparatus of this type, in which a branching conveying path is inserted into a rectilinear conveying path embodied as a double-belt conveyor, which branching conveying path is arranged transversely thereto. The branching conveying path can be pivoted about a fulcrum from an initial position lying below the plane of the feeding conveying path into a removal position lying above the plane of the feeding conveying path.

SUMMARY AND ADVANTAGES OF THE INVENTION

The apparatus for shifting work carriers from a feeding conveying path to a further conveying path according to the invention is of the type initially described above, having a lifting device which is arranged in a transfer zone for the work carrier and with which the work carrier can be transferred from the feeding conveying path onto the further conveying path, and wherein: at least one conveying path has at least one transport belt; the lifting device is provided with means which act on at least one of the transport belts such that, when the lifting device is actuated, the tight side of the transport belt, which side serves as a rest for the work carrier, can be lifted and lowered from a first plane into a second plane, has a cost-effective construction since no additionally driven conveying section is necessary. The apparatus according to the invention utilizes the transport belts of the existing transport paths and is therefore restricted merely to an extension of the latter with one or more lifting devices. Thus an additional drive motor for the shifting apparatus is dispensed with.

Advantageous further developments of the apparatus according to the invention are possible by additionally disclosed the measures. An especially advantageous embodiment is possible in double-belt conveying systems, with the lifting device being inserted into the discharging conveying path. A lifting device of simple construction is available with a piston/cylinder unit acted upon on one side by a pressure medium, the piston being preloaded by spring elements. Furthermore, the lifting device can conveniently be stretched below the tight side of the transport belt over a length which approximately corresponds to the length of the work carrier. An embodiment of the lifting device in the modular dimension of the work carriers permits adaptation to different work-carrier dimensions. An advantageous fitting of the lifting device is possible by a basic body of the lifting device, which basic body can be fastened in the longitudinal section of the transport frame.

BRIEF DESCRIPTION OF THE DRAWINGS

An exemplary embodiment of the invention is shown in the drawing and described in more detail below. In the drawing.

DETAILED DESCRIPTION OF THE PREFERRED EMBODIMENTS

Figure 1:
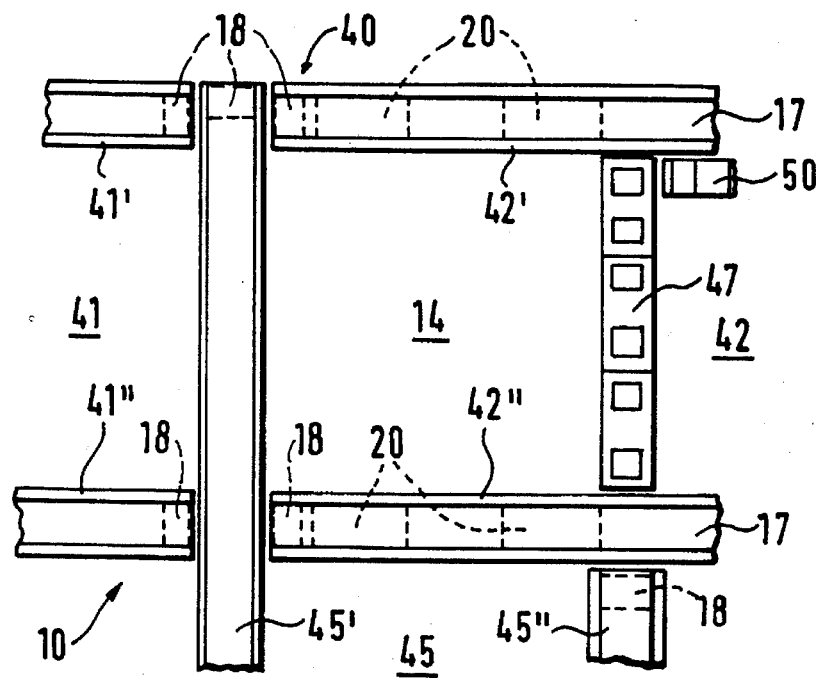
FIG. 1 shows a plan view of a double-belt conveyor system having an apparatus according to the invention.
Figure 4:
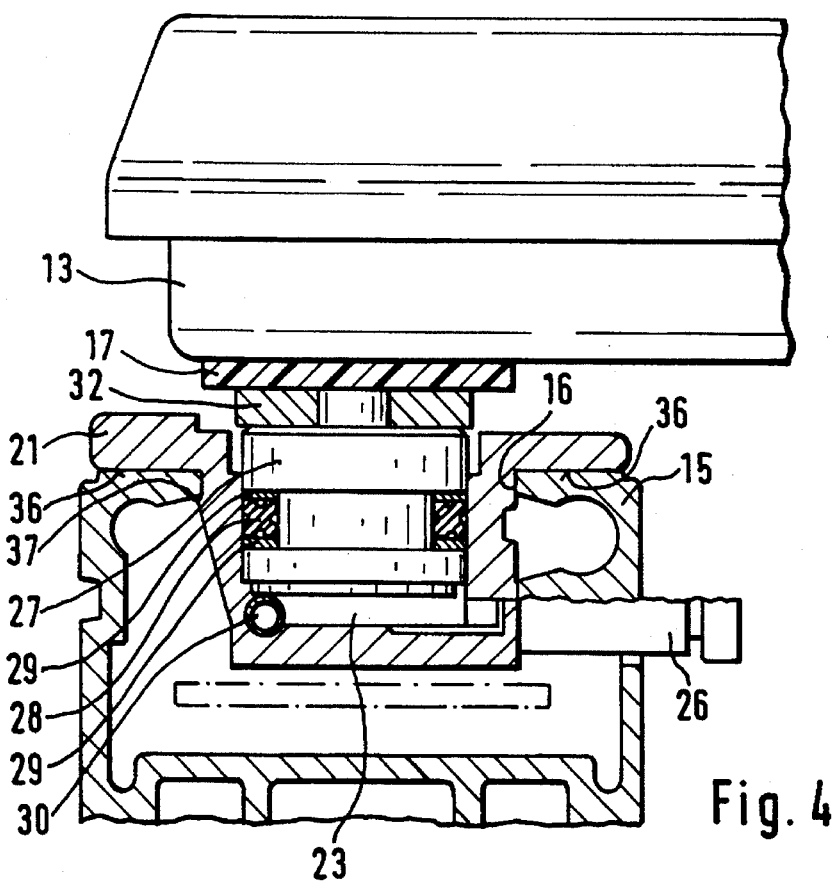
FIG. 4 shows a section along lines IV—IV of FIG. 2.
Figure 5:
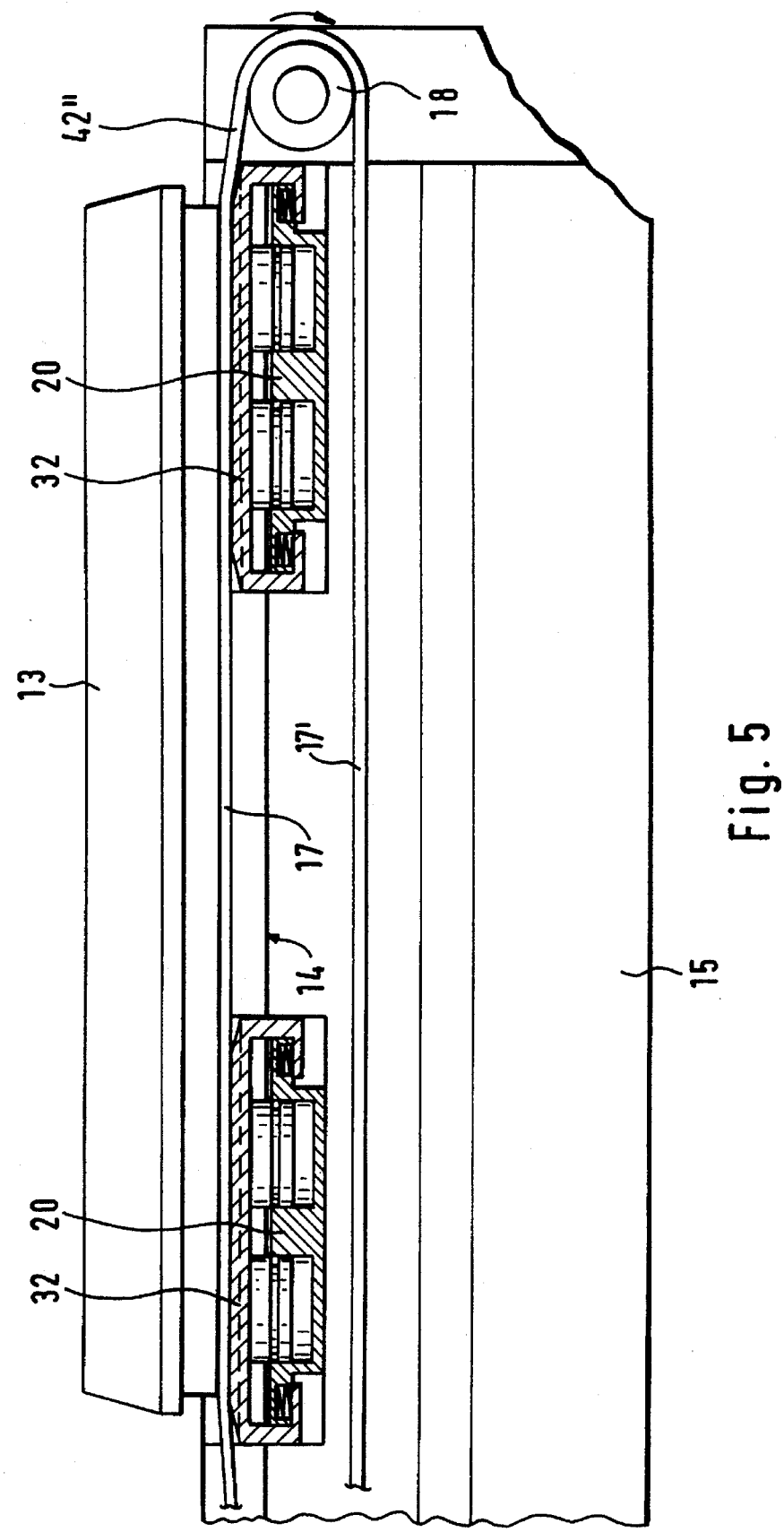
FIG. 5 shows a side view of the apparatus according to the invention having two lifting devices.

FIG. 1 shows a double-belt conveying system 10 having a rectilinear main conveying path 40 and a branching conveying path 45 arranged transversely thereto. A transfer zone 14 for work carriers 13 according to FIGS. 4 and 5 is formed at the intersection of the conveying paths 40, 45. The rectilinear main conveying path 40 has a feeding conveying path 41 having two transport belts 41', 41", running in parallel next to one another, and a discharging conveying path 42 likewise having two transport belts 42', 42" running in parallel next to one another. The branching conveying path 45 likewise has two transport belts 45', 45" running in parallel next to one another, the one transport belt 45' being arranged between the feeding conveying path 41 and the discharging conveying path 42. The other transport belt 45" adjoins the transport belt 42" of the discharging conveying path 42.

In an extension of the transport belt 45", a roller path 47 is arranged between the transport belts 42' and 42". At the ends of the conveying paths 41, 42, 45, the transport belts 41', 41", 42', 42", 45', 45" are run over deflection rollers or drive rollers 18. Each transport belt 41', 41", 42', 42", 45', 45" has a tight side 17 and a loose side 17', the work carrier 13 resting on the tight side 17 (FIG. 5). Arranged below the tight side 17 of each of the transport belts 42' and 42" are, for example, two lifting devices 20 which lift and lower the respective tight side 17.

Furthermore, the discharging conveying path 42 has a stop device 50 which is embodied in such a way that, according to choice, the work carrier 13 either performs rectilinear travel or is brought to a stop in the transfer zone 14. In the process, the work carrier 13 is positioned in the transfer zone 14 in such a way that it is located above the transport belt 45' and the roller path 47.

The width of the conveying paths 40 and 45 is determined by the dimensions of the work carrier 13. The transport belts 41', 41" of the feeding conveying path 41 and the transport belts 42', 42" of the discharging conveying path 42 are located in a plane which lies, for example, two millimeters above the plane of the transport belts 45', 45" of the branching conveying path 45. The lifting devices 20 acting on the transport belts 42' and 42" are set in such a way that the transport belts 42', 42" can be lowered below the plane of the transport belt 45'. The work carrier 13 located in the transfer zone 14 is thereby set down on the transport belt 45' and the roller path 47, and is removed from the transfer zone 14 by the transport belt 45' and later additionally by the transport belt 45".

Figure 2:
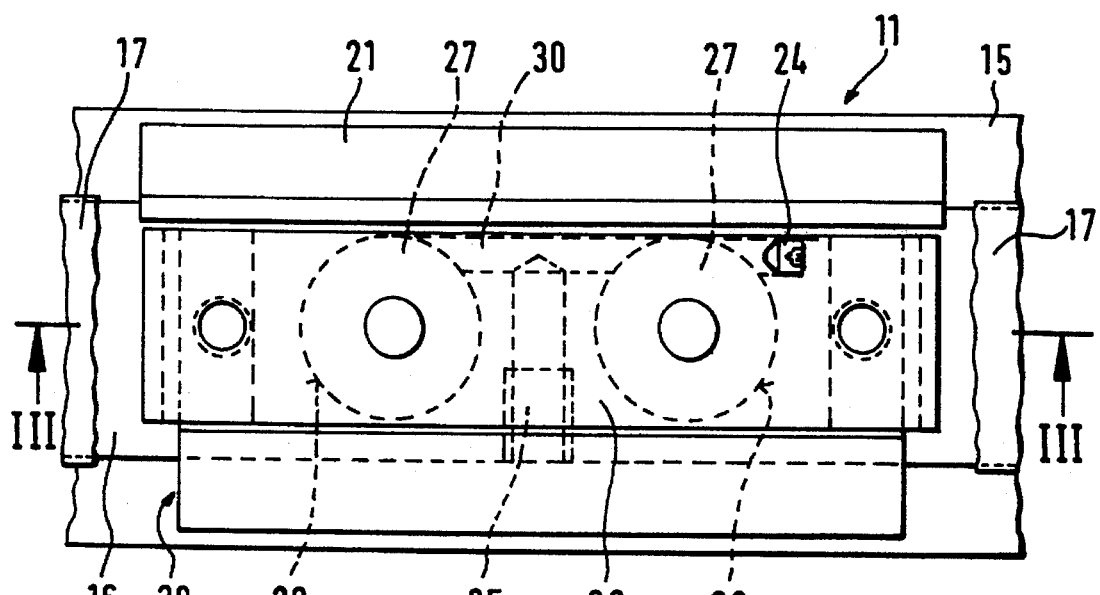
FIG. 2 shows a plan view of a lifting device of the apparatus according to the invention.

FIG. 2 shows a detail of a conveying-path frame 11 of the double-belt conveying system 10. The conveying-path frame 11 is formed from a section girder 15 which has a longitudinal groove 16 in which the lifting device 20 is fastened (FIG. 4). The tight side 17 of one of the transport belts 42' or 42" is guided above the section in guides (not shown), parts of the tight side 17 being indicated in FIG. 2 merely to the left and right of the lifting device 20 in order to more clearly show the lifting device 20.

Figure 3:
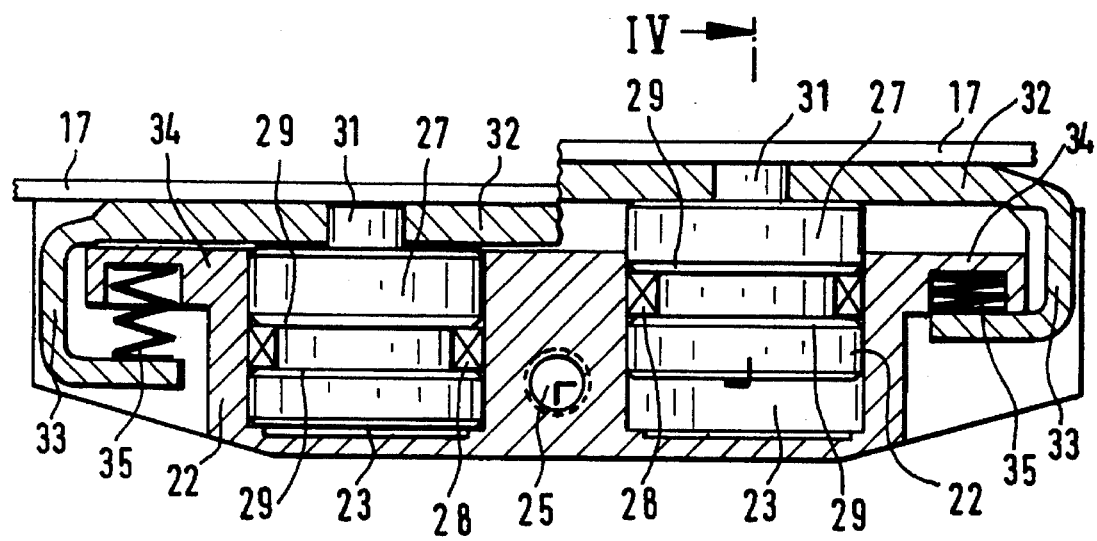
FIG. 3 shows a section along lines III—III of FIG. 2.

According to FIGS. 2 and 3, the lifting device 20 has a basic body 21 having, for example, two piston/cylinder units 22, each having a cylinder 23 and a piston 27. The cylinders 23 are connected to one another via a passage 30 made laterally in the basic body 21, the bore opening of the passage 30 being closed with a sealing screw 24. Furthermore, a connection bore 25 to the passage 30 is placed in the basic body 21, which connection bore 25 has a thread into which a compressed-air connection 26 is tightly screwed (FIG. 4).

According to FIG. 4, the basic body 21 of the lifting device 20 is profiled in such a way that it can be inserted, for example, into the longitudinal groove 16 of the section girder 15, the basic body 21 to this end being embodied with bearing surfaces 36 and catch elements 37. The bearing surfaces 36 rest on the section girder 15. The catch elements 37 reach behind the longitudinal groove 16. The lifting device 20 can thus be locked in the section girder 15.

The pistons 27 are each guided with a sealing ring 28 and two supporting rings 29 in the cylinders 22 according to FIGS. 3 and 4. FIG. 3 shows the two pistons 27 in two different positions, the left-hand piston in the direction of view being located in its initial position and the right-hand piston in the direction of view being located in its lifting position. The two pistons 27 each have a stem 31 at their end face projecting from the cylinders 22. The two pistons 27 act on a clasp-shaped pressure part 32. The tight side 17 of the transport belts 42', 42" slides on the pressure part 32. Provided in the pressure part 32 are two bores into which the two stems 31 of the pistons 27 are inserted for adjusting the pressure part 32. The pressure part 32 has a bend 33 at each of its two ends, the bends 33 each running parallel to the sliding surface of the pressure part 32 and to one another. The bends 33 each reach behind a portion 34 of the basic body 21. A compression spring 35 is in each case inserted between bend 33 and portion 34, which compression spring 35 restrains the pressure part 32 against the basic body 21 so that the pistons 27 work against the preloading of the two springs 35 during the retraction from the cylinder 23. When the compressed air acting on the pistons 27 is expanded, the pistons 27 and thus the pressure part 32 are moved into the initial position by the preloading of the compression springs 35. Consequently, the piston/cylinder unit 22 need only be acted upon by pressure on one side.

FIG. 5 shows the transfer zone 14 according to FIG. 1 in lateral sectional representation. The two lifting devices 20 are arranged at the beginning and end of the transfer zone 14. The width of the transfer zone 14 is here determined by the size of the work carrier 13. It is likewise convenient to dimension the length of a lifting device 20 according to the modular dimension of the work carriers 13, as a result of which it is possible for the entire transfer zone 14 to be equipped with a plurality of lifting devices 20 arranged one behind the other. By a corresponding number of lifting devices 20, the desired length can be realized in accordance with the length of the work carrier 13. At the end of the transport section, the transport belt 42', 42" is placed around the drive roller 18 so that the tight side 17 having the work carrier 13 resting on it runs at the top and the returning loose side 17' runs underneath. The elasticity of the belt material is sufficient in order to perform a lifting movement of, for example, 4 mm by stretching of the transport belt.

The mode of operation of the apparatus according to the invention may be explained with reference to FIG. 1. When a work carrier 13 is channeled into the transfer zone 14, the stop device 50 is actuated during preprogrammed shifting into the branching conveying path 45, which stop device 50 brings the work carrier 13 to a stop over the transfer zone 14. After the work carrier 13 is stopped in this position, the compressed air fed to the two piston/cylinder units 22 is relieved and the pistons 27 are pressed downward into the initial position (FIG. 3, left) by means of the spring force of the compression springs 35. The work carrier 13 is thus lowered onto the transport belt 45' and the roller path 47. The amount of lowering is here selected in such a way that the plane of the transport belts 42', 42" is about 2 millimeters below the plane of the transport belt 45'. After the transport belt 45' has taken hold of the work carrier 13, the latter is pulled by the transport belt 45' out of the transfer zone 14 and is then additionally taken hold of by the other transport belt 45". After a work carrier is delivered from the transfer zone 14, compressed air is again admitted to the cylinders 23 of the piston/cylinder units 22, as a result of which the transport belts 42', 42" are lifted into the lifting position. If rectilinear travel is to be realized, the stop device 50 remains inactivated and the lifting devices 20 remain in their lifting position (FIG. 3, right).

Apart from the use in a double-belt conveying system as described, the apparatus according to the invention can also be used in other transport systems for workpieces or work carriers.

We claim:

1. An apparatus for shifting work carriers from a feeding conveying path to a further conveying path, said apparatus comprising: a lifting device arranged in a transfer zone for the work carrier and with which the work carrier can be transferred from a feeding conveying path onto a further conveying path, with at least one said conveying path having at least one transport belt having a tight side which serves as a support for the work carrier, and with said lifting device acting on at least one of the transport belts such that, when the lifting device is actuated, the tight side of the transport belt can be lifted and lowered from a first plane into a second plane; and wherein said lifting device has a basic body at least one piston/cylinder unit having a cylinder and a piston, and a pressure piece on which the piston acts, with the pressure piece being able to act on the tight side of the transport belt from the side opposite the bearing surface of the work carrier such that the tight side of the transport belt can be lifted and lowered.

2. The apparatus as claimed in claim 1, wherein a discharging conveying path (42) is provided in the conveying direction of the feeding conveying path; a branching conveying path is arranged between the feeding conveying path and the discharging conveying path; the lifting device is able to act on the discharging conveying path with, the plane of the feeding conveying path being above the plane of the branching conveying path; and the discharging conveying path can be lifted and lowered by the lifting device (20) from a plane below the plane of the branching conveying path into the plane of the feeding conveying path and vice versa.

3. The apparatus as claimed in claim 2, wherein the conveying paths are each double-belt conveyors having transport belts, and wherein one transport belt (45') of the branching conveying path is arranged between the feeding conveying path and the discharging conveying path.

4. The apparatus as claimed in claim 2, wherein the feeding conveying path is equipped with a stop device, with which a work carrier can be positioned in the transfer zone, and wherein the lifting device can be activated after positioning of the work carrier in the transfer zone.

5. The apparatus as claimed in claim 1, wherein said lifting device acts on the transport belt such that the tight side of the transport belt, in the area of the transfer zone, is lifted approximately in parallel over a length which at least approximately corresponds to the length of the work carrier.

6. The apparatus as claimed in claim 1, wherein the piston can be acted upon on one side by pressure, and wherein at least one spring element is provided so that, after the cylinder is relieved, the piston together with the pressure piece can be passed into the initial position.

7. The apparatus as claimed in claim 1, wherein the pressure piece is provided with parts bent at right angles which reach under the basic body at its two ends, and wherein the transport belt rests on the top of the pressure piece.

* * * * *